June 20, 1939.  H. F. SMITH  2,162,761
STEERING WHEEL HUB STRUCTURE
Filed May 2, 1938
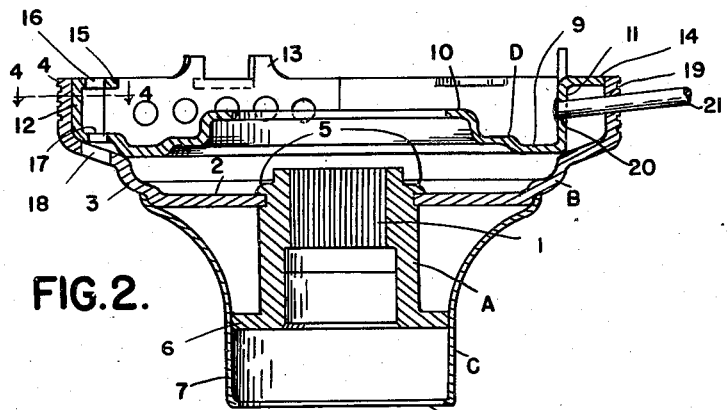
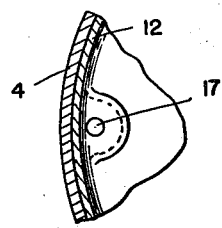
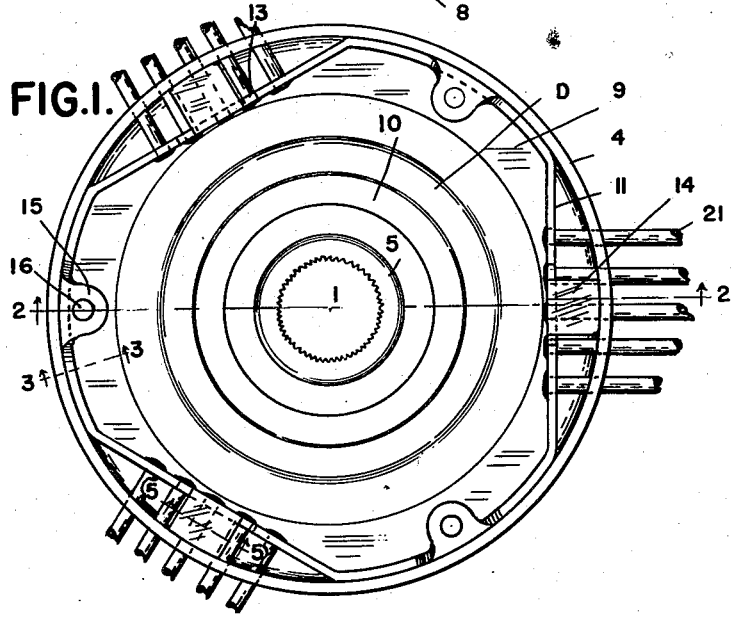
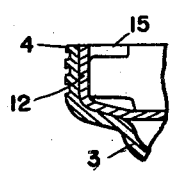
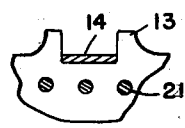
INVENTOR
HARRY F. SMITH
BY
*Whittemore, Hulbert & Belknap*
ATTORNEYS Patented June 20, 1939

2,162,761

UNITED STATES PATENT OFFICE 2,162,761

STEERING WHEEL HUB STRUCTURE

Harry F. Smith, Toledo, Ohio, assignor to The Acklin Stamping Company, Toledo, Ohio, a corporation of Ohio Application May 2, 1938, Serial No. 205,636

15 Claims. (Cl. 74—552)

This invention relates generally to vehicle steering wheels and refers more particularly to the hub structures thereof.

One of the essential objects of the invention is to provide a structure of this type wherein the parts are so constructed and arranged that they may be readily assembled and may be effectively united by hydrogen-electric brazing operations.

Another object is to provide a hub structure that is economical to manufacture and sturdy and durable in construction.

Another object is to provide a hub structure that is compact and pleasing in appearance.

Other objects, advantages and novel details of construction of this invention will be made more apparent as this description proceeds, especially when considered in connection with the accompanying drawing, wherein:

Figure 1 is a fragmentary top plan view of a steering wheel embodying my invention;

Figure 2 is a sectional view taken substantially on the line 2—2 of Figure 1;

Figure 3 is a fragmentary sectional view taken substantially on the line 3—3 of Figure 1;

Figure 4 is a fragmentary sectional view taken substantially on the line 4—4 of Figure 2;

Figure 5 is a fragmentary sectional view taken substantially on the line 5—5 of Figure 1.

Referring now to the drawing, A is the bushing, B is the upper section of the outer shell, C is the lower section of the outer shell, and D is the inner shell of a hub structure embodying my invention. Preferably the bushing A is a screw machine part and has a central bore or opening 1 for engagement with a suitable steering shaft (not shown).

The upper section B of the outer shell is a stamping of relatively heavy gauge metal and is preferably cup-shape in configuration. The base 2 of the cup is non-rotatably sleeved upon the bushing A at its upper end and is secured thereto by a hydrogen-electric brazing operation, while the sides 3 of the cup flare outwardly and upwardly from the base and terminate in an upright cylindrical portion 4. Preferably portions 5 of the bushing are clinched securely over the base 2 before the latter is brazed to the bushing.

The lower section C of the outer shell is a stamping of relatively light gauge metal and is sleeved upon and brazed to the base 2 of the upper section and to a lateral flange 6 at the lower end of the bushing. As shown, this lower section C tapers inwardly and downwardly from the base 2 of the upper section and forms in effect a continuation of the sides 3 of the upper section. Preferably this lower section C has a cylindrical portion 7 that extends below the lower end of the bushing A and is provided at its lower end with an opening 8 for receiving the head (not shown) of a steering column.

The inner shell D is also a stamping and is substantially cup-shaped in configuration. The base 9 of said stamping rests upon and is hydrogen-electric brazed to the flaring sides 3 of the upper section of the outer shell and is provided at the center thereof with a raised apertured portion 10. With the exception of three substantially straight portions 11, the sides 12 of the cup D conform in curvature to and are secured by hydrogen-electric brazing to the cylindrical portion 4 of the upper section. Projecting upwardly from the upper edges of the straight portions 11 are spaced lugs 13 arranged in pairs for engagement with the radial arms (not shown) of an electric horn push button ring, while projecting laterally from said straight portions 11, preferably at points between the lugs 13 of each pair, are flanges 14 that extend and are hydrogen-electric brazed to the cylindrical portion 4 of the upper section B of the outer shell. 15 are lugs projecting laterally inwardly from the curved sides 12 of the inner shell and having openings 16 therein in alignment with registering openings 17 and 18 respectively in the base 9 of the inner shell and in the flaring sides 3 of the upper section for the reception of suitable securing elements (not shown) for the push button assembly.

In the present instance the cylindrical portion 4 of the upper section and the straight portions 11 of the inner shell are provided with aligned holes 19 and 20, respectively, for suitable spokes such as 21. As shown, the inner ends of these spokes are anchored upon the inner sides of the straight portions 11 of the inner shell.

Thus, from the foregoing it will be apparent that all of the parts of my hub structure with the exception of the bushing A are metal stampings that may be readily and accurately made. The base 2 of the upper section and the lateral flange 6 of the bushing serve effectively as spacers and braces between the bushing and outer shell; the cylindrical and straight portions 4 and 11 respectively of the upper section and inner shell provide spaced bearings for the spokes; and the hub parts are constructed and assembled in such a way that they may be rigidly united by hydrogen-electric brazing operations. Consequently, the finished hub structure is neat, compact and pleasing in appearance.

What I claim as my invention is:

1. In a steering wheel, a hub structure including a bushing having a lateral flange, an outer shell brazed to said flange and having an inwardly extending portion spaced from the flange and brazed to said bushing, an inner shell brazed to the outer shell, portions of said inner and outer shells being spaced apart, and spokes engaging holes in said spaced portions and anchored to one of said portions.

2. In a steering wheel, a hub structure including a bushing, an outer shell encircling and connected to said bushing, and an inner shell and secured to said outer shell, said inner shell having upstanding lugs for engagement with the radial arms of a horn push button ring.

3. In a steering wheel, a hub structure including a bushing, an outer shell encircling and connected to said bushing, an inner shell secured to said outer shell, said inner shell having substantially straight portions cooperating with portions of the outer shell to provide spaced supports for spokes, and braces projecting between said spaced supports.

4. In a steering wheel, a hub structure including a center member apertured to receive a part of a steering shaft, a substantially cup-shaped member having its base anchored on said center member, and a second substantially cup-shaped member anchored within the first-mentioned cup-shaped member aforesaid, portions of the side walls of said cup-shaped members being spaced apart and apertured to receive radially extending spokes, other portions of said side walls being anchored to the side walls of the first-mentioned cup-shaped member.

5. In a steering wheel, a hub structure including a center member apertured to receive a part of a steering shaft, a substantially cup-shaped member having its base anchored on said center member, the sides of said cup-shaped member flaring outwardly and upwardly from the base of said member and terminating in an upright substantially cylindrical portion, and a second substantially cup-shaped member having its base anchored upon the flaring sides of the first mentioned cup-shaped member and having upright substantially cylindrical portions and straight side portions, said straight side portions and the cylindrical portion of the first-mentioned cup-shaped member being apertured to receive radially extending spokes.

6. In a steering wheel, a hub structure including a center member apertured to receive a part of a steering shaft and provided at its lower end with a lateral flange, a substantially cup-shaped member having its base anchored upon said center member at its upper end, a skirt sleeved upon and secured to the base of said cup-shaped member and said lateral flange, said skirt forming in effect a downward continuation of the side walls of said cup-shaped member.

7. In a steering wheel, a hub structure including a center member apertured to receive a part of a steering shaft, a substantially cup-shaped member having its base anchored upon said center member at its upper end, a skirt sleeved upon and secured to the base of said cup-shaped member and said center member, said skirt forming in effect a downward continuation of the side walls of said cup-shaped member.

8. In a steering wheel, a hub structure including a center member apertured to receive a part of a steering shaft, a substantially cup-shaped member having its base anchored upon said center member, the sides of said cup-shaped member flaring outwardly and upwardly and terminating in an upright substantially cylindrical portion, and a skirt sleeved upon and secured to the base of said cup-shaped member and encircling and secured to said center member, said skirt forming in effect a downward continuation of the flaring sides aforesaid.

9. In a steering wheel, a hub structure including a center member apertured to receive a part of a steering shaft, a substantially cup-shaped member having its base anchored upon said center member, the sides of said cup-shaped member flaring outwardly and upwardly and terminating in an upright substantially cylindrical portion, and a substantially cup-shaped member within said cylindrical portion, the base of the second mentioned cup-shaped member being rigidly secured to the flaring sides of the first mentioned cup-shaped member and spaced from said center member, spokes extending through the cylindrical portion of the first mentioned cup-shaped member and through the side walls of the second mentioned cup-shaped member, and means securing said spokes to at least one of said cup-shaped members.

10. In a steering wheel, a hub structure including a center member apertured to receive a part of a steering shaft, a substantially cup-shaped member having its base anchored to said center member, a second cup-shaped member anchored within the first mentioned cup-shaped member and spaced from said center member, spokes extending through holes in the side walls of both cup-shaped members, and means securing said spokes to at least one of said members.

11. In a steering wheel, a hub structure including a center member apertured to receive a part of a steering shaft, a substantially cup-shaped member having its base anchored to said center member, a second cup-shaped member anchored within the first mentioned cup-shaped member, the side walls of both cup-shaped members being apertured to receive radially extending spokes, and the side walls of one of said cup-shaped members having upstanding lugs for engagement with the radial arms of a horn push button ring.

12. In a steering wheel, a hub structure including a center member apertured to receive a part of a steering shaft, a substantially cup-shaped member having its base anchored to said center member, a second cup-shaped member anchored within the first mentioned cup-shaped member, the side walls of both of said cup-shaped members being apertured to receive radially extending spokes, and the side walls of one of said cup-shaped members having lateral flanges extending to and rigidly secured to the side walls of the other cup-shaped member so as to form braces therebetween.

13. In a steering wheel, a hub structure including a center member apertured to receive a part of a steering shaft, a substantially cup-shaped member having its base anchored on said center member, a second substantially cup-shaped member having its base anchored within the first mentioned cup-shaped member, said bases having aligned openings, the side walls of both of said cup-shaped members being apertured to receive radially extending spokes, the side walls of one of said cup-shaped members having upstanding means for engagement with the radial arms of a horn push button ring, and the side walls of one of said cup-shaped members having lateral projections provided with openings in alignment with said aligned openings in the cup-shaped members for the reception of securing means for a push button assembly.

14. In a steering wheel, a hub structure including a center member apertured to receive a part of a steering shaft, a substantially cup-shaped member having its base anchored on said center member, a second substantially cup-shaped member having its base anchored within the first mentioned cup-shaped member and spaced from said center member, and spokes extending through the side walls of both of said cup-shaped members and rigidly secured to the side walls of one of them.

15. In a steering wheel, a hub structure including a center member apertured to receive a part of a steering shaft, a substantially cup-shaped member having its base anchored on said center member, and a second substantially cup-shaped member anchored within the first mentioned cup-shaped member, said second cup-shaped member having substantially cylindrical upright portions and straight side upright portions the side wall of the first-mentioned cup-shaped member and said straight side portions having substantially aligned holes for receiving radially extending spokes.

HARRY F. SMITH.